United States Patent
Nam et al.

(10) Patent No.: US 6,770,842 B2
(45) Date of Patent: Aug. 3, 2004

(54) METHOD AND APPARATUS FOR CUTTING A SUBSTRATE INTO MULTIPLE PIECES WITH A SINGLE IRRADIATION OF A LASER BEAM

(75) Inventors: Hyung-Woo Nam, Yongin-si (KR); Dae-Ho Choo, Suwon-si (KR); Baek-Kyun Jeon, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/176,041

(22) Filed: Jun. 21, 2002

(65) Prior Publication Data

US 2002/0195434 A1 Dec. 26, 2002

(30) Foreign Application Priority Data

Jun. 21, 2001 (KR) .......................................... 2001-35479

(51) Int. Cl.$^7$ ............................................... B23K 26/00
(52) U.S. Cl. ............................. 219/121.72; 219/121.67; 219/121.85
(58) Field of Search ..................... 219/121.72, 121.67, 219/121.6, 121.85

(56) References Cited

U.S. PATENT DOCUMENTS

| | | | | | |
|---|---|---|---|---|---|
| 3,932,726 | A | * | 1/1976 | Verheyen et al. | 219/121.67 |
| 4,403,134 | A | * | 9/1983 | Klingel | 219/121.67 |
| 6,130,401 | A | * | 10/2000 | Yoo et al. | 219/121.6 |
| 6,211,488 | B1 | * | 4/2001 | Hoekstra et al. | 219/121.72 |
| 6,252,197 | B1 | * | 6/2001 | Hoekstra et al. | 219/121.84 |
| 6,259,058 | B1 | * | 7/2001 | Hoekstra | 219/121.75 |

* cited by examiner

Primary Examiner—M. Alexandra Elve
(74) Attorney, Agent, or Firm—McGuireWoods LLP

(57) ABSTRACT

A method and apparatus for multiple-cutting a substrate into a plurality of pieces with a single irradiation of a laser beam are disclosed. At least two light reflectivity/transmittance control plates are placed on a path through which the light passes such that light reflectivity/transmittance is varied depending on an angle between the generated light and the plates. Plural surface portions of the substrate are heated simultaneously and are then cooled by a sprayed coolant so that the substrate is cut into a plurality of pieces simultaneously. Resultantly, a cutting time is substantially shortened and the productivity is enhanced.

20 Claims, 10 Drawing Sheets

METHOD AND APPARATUS FOR CUTTING A SUBSTRATE INTO MULTIPLE PIECES WITH A SINGLE IRRADIATION OF A LASER BEAM

BACKGROUND OF THE INVENTION

1. Field of the Invention

The present invention relates to a technique of cutting a substrate into multiple pieces using a heat stress, and more particularly, to method and apparatus for cutting a substrate into multiple pieces with irradiation of a laser beam in which a light beam, generated from a single light generating unit with a specific wavelength and power, is divided into multiple light beams having uniform power, the substrate is locally and rapidly heated by the respective divided beams and then rapidly cooled by a coolant, and thereby the substrate is concurrently cut along plural cutting lines to give multiple pieces.

2. Description of the Related Art

Generally, glass substrate has been widely used for industrial, commercial, and residence applications, to name a few. These glass substrates are made from silicon that is a main component. Also, these glass substrates have a non-crystalline structure that is an inherent characteristic of glass. When a minute groove is formed at an edge of the glass substrate, the non-crystalline structure acts to trigger an occurrence of minute cracks by a small impact or a small external force.

When an external impact or force is applied to the minute cracks, the cracks are propagated along unpredictable directions and therefore an undesired separation occurs in the glass substrate. Thus, there is a problem in that it is nearly impossible to forecast the direction of the generated crack and a portion of the substrate is cut that needs not be cut.

This problem frequently occurs when a diamond cutter is used for the cutting of a workpiece glass substrate in which a fine groove is formed at the surface of the workpiece glass substrate and then some external force is applied. This is because the fine groove formed by the diamond cutter is very rough.

Thus, in the case that the cut groove of the workpiece glass substrate is not smooth, undesired cracks occur additively and the crack propagates along an undesired direction, which causes a fatal failure.

Because of these problems, a diamond cutter is mainly used only as a cutting tool for cutting a commercial glass substrate, a household glass substrate, etc., but is subject to many limitations in a technical field such as a liquid crystal display (LCD) requiring precise cutting.

In spite of these limitations, and since methods and apparatuses for use in the LCD technical field requiring a precise cutting of glass substrates are not yet developed, the use of the diamond cutter is inevitable.

Due to the use of the diamond cutter, there is a problem of unpredictable cracks and the cracks progating when separating a completed LCD mother panel into unit panels.

SUMMARY OF THE INVENTION

Accordingly, it is an object of the present invention to provide a method for multiple-cutting a substrate in which a substrate is cut by a heat stress such that an occurrence of cracks is restrained at an edge of the substrate and therefore crack propagation along an undesired direction does not occur.

It is another object of this invention to provide a method for multiple-cutting a substrate in which plural places of the substrate are concurrently and rapidly heated and then rapidly cooled using a single laser beam for heating the substrate, so that the plural places of the substrate are concurrently separated.

It is still another object to provide an apparatus for multiple-cutting a substrate in which a single laser beam for heating the substrate is uniformly divided into at least two beams, the divided beams concurrently heat at least one prescribed cutting line, the heated prescribed cutting line is concurrently cooled, so that plural places of the substrate are concurrently cut.

To achieve the aforementioned objects, there is provided a method of multiple-cutting a substrate. In the above method, a part of an incident light in a first advancing direction is reflected into a second advancing direction and the remaining part of the incident light advances along the first advancing direction to split the incident light into two light beams. The split lights are scanned onto plural selected paths of the substrate to locally heat the selected paths of the substrate. Thereby, cracks are generated at the heated paths.

According to another aspect of this invention, there is provided an apparatus for multiple-cutting a substrate into multiple pieces using a single scanning of a light. The apparatus comprises: a light splitting unit for splitting a light generated from a light generating unit using at least two light reflectivity/transmittance control plates of which light reflectivity/transmittance varies depending on an angle between the generated light and the plates, and for scanning the split lights onto at least two scanning surface portions to locally heat the scanning surface portions; and a crack generating unit for generating a crack at the locally heated scanning surface portions.

BRIEF DESCRIPTION OF THE DRAWINGS

The above objects and other advantages of the present invention will become more apparent by describing in detail the preferred embodiments thereof with reference to the accompanying drawings.

DETAILED DESCRIPTION OF THE PREFERRED EMBODIMENTS

Now, preferred embodiments of the present invention will be described in detail with reference to the accompanying drawings.

Figure 1:
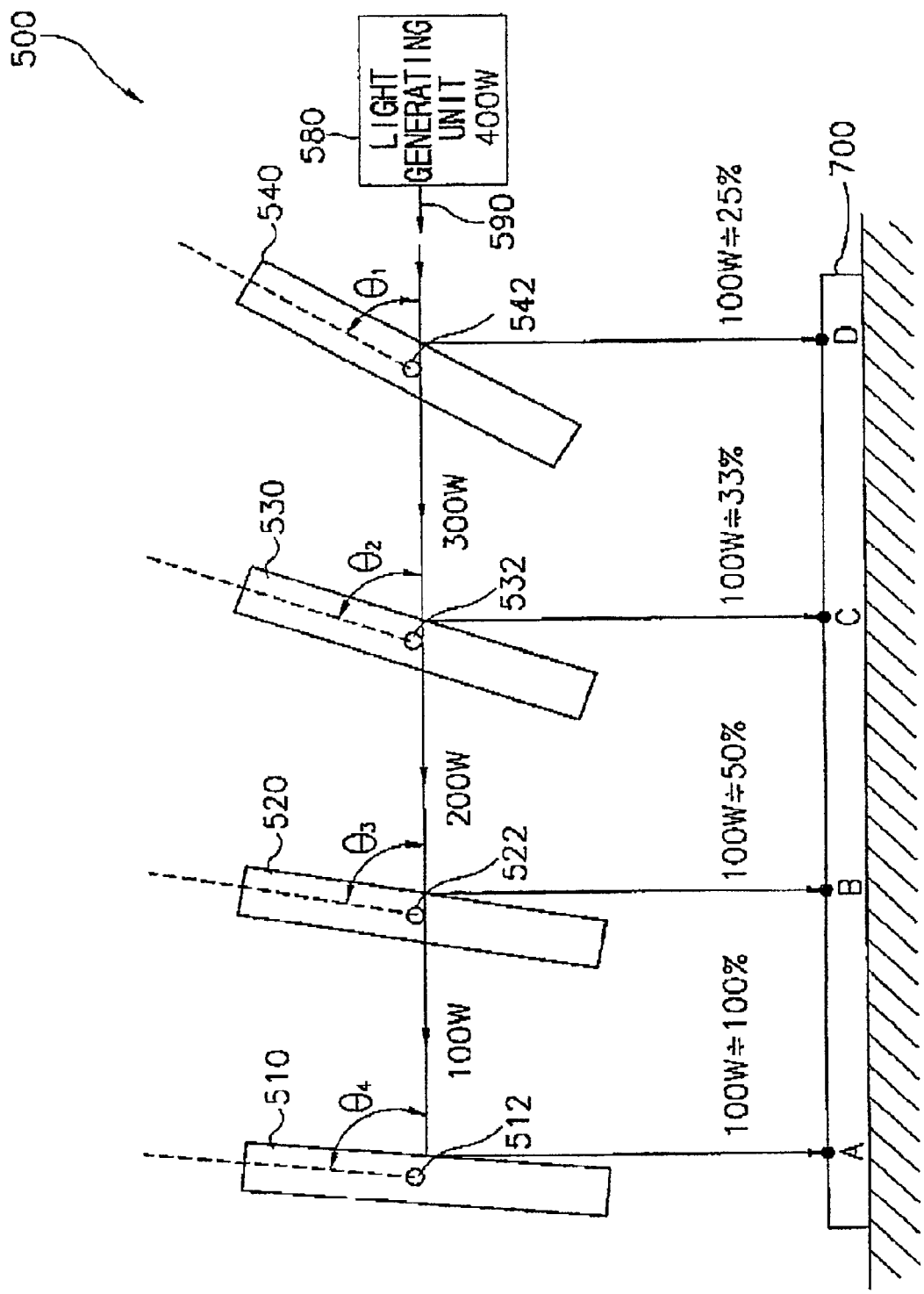
FIG. 1 is a schematic view of a light splitting apparatus in accordance with a preferred embodiment of the present invention.
Figure 2:
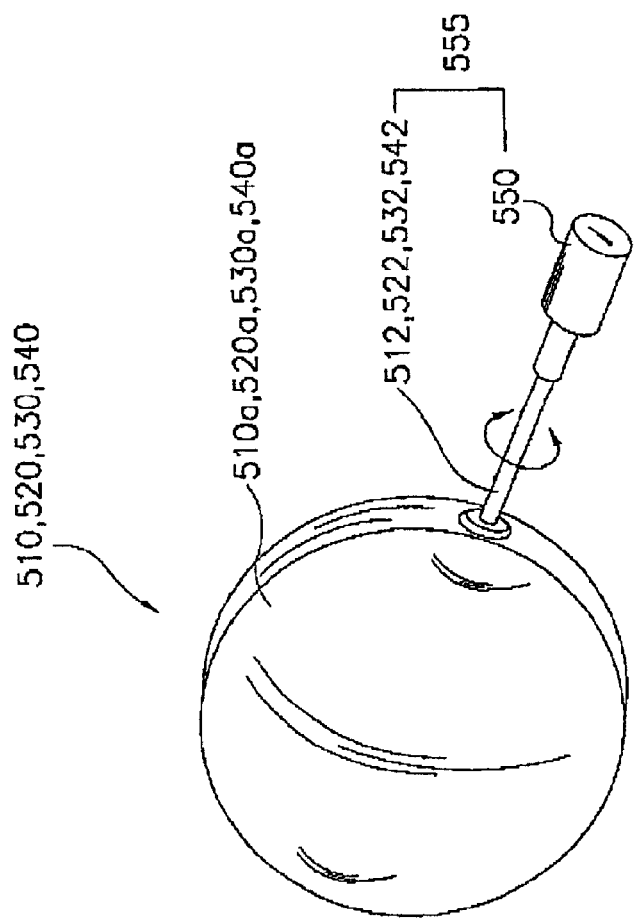
FIG. 2 is a perspective view of a light reflectivity/transmittance control plate in accordance with another preferred embodiment of the present invention.
Figure 3:
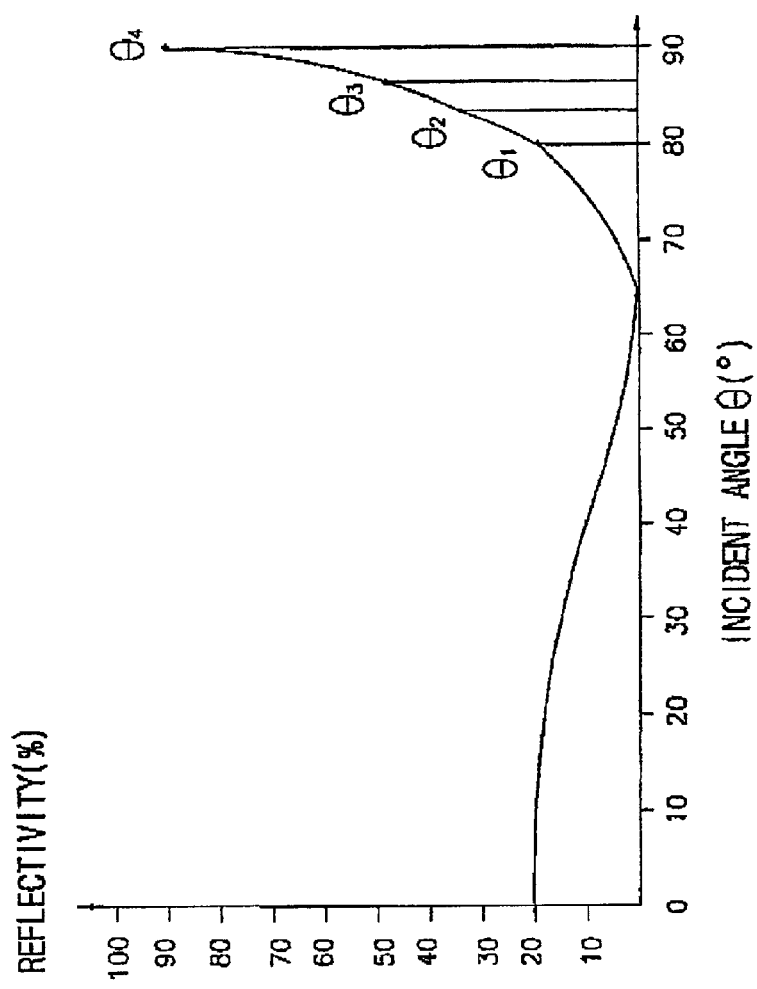
FIG. 3 is a graph showing that the light reflectivity is varied depending on an angle between the light reflectivity/transmittance control plate and a light.

FIGS. 1 to 3 show a constitution of a light multiple-splitting device in accordance with a preferred embodiment of the present invention.

As a whole, a light multiple-splitting device 500 includes at least one light reflectivity/transmittance control plates 510, 520, 530, 540, a light incident angle control unit 555 and a base body (not shown) provided with the light reflectivity/transmittance control plate 510, 520, 530, 540 and the light incident angle control unit 555.

Four light reflectivity/transmittance control plates 510, 520, 530, 540 are used in the present embodiment.

Particularly, the light reflectivity/transmittance control plates 510, 520, 530, 540 are manufactured to have functions in which when a light 590, having a certain wavelength and intensity, arrives on reflection/transmission surfaces of respective light reflectivity/transmittance control plates 510, 520, 530, 540, the light reflectivity/transmittance control plates 510, 520, 530, 540 reflect a part of the light and transmit the remainder of the light.

As one embodiment, the light reflectivity control plates 510, 520, 530, 540 are made of ZnSe to reflect and/or transmit light.

The reference numeral 580 in FIG. 1 is a light generating unit for generating a light necessary for cutting a workpiece substrate. A laser beam having a predetermined wavelength and intensity may be used as the necessary light.

At this time, angles θ1, θ2, θ3, θ4 between the light generated from the light generating unit 580 and the reflection/transmission surfaces largely affect transmittance and reflectivity in the light.

FIG. 3 is a graph showing a variation in the reflectivity of a light reflected from the light reflectivity/transmittance control plates 510, 520, 530, 540 when the angles θ1, θ2, θ3, θ4, between the light generated from the light generating unit 580 and the reflection/transmission surfaces, are varied.

In order to obtain results as shown in the graph of FIG. 3, the light reflectivity/transmittance control plates 510, 520, 530, 540 are made of ZnSe and the necessary light has a wavelength of 10.6 $\mu$m.

Referring to the graph of FIG. 3, in a state that the light is horizontally scanned, when the reflection/transmission surfaces of the light reflectivity/transmittance control plates 510, 520, 530, 540 are inclined 70 degrees in the clockwise direction with respect to the horizontal plane, the reflectivity of the light reflectivity/transmittance control plates 510, 520, 530, 540 is 0%. At this position, the reflectivity of 0% means that the light reflectivity/transmittance control plates 510, 520, 530, 540 do not reflect the light 500 at all but transmit the light 500 completely.

Meanwhile, when the inclination of the light reflectivity/transmittance control plates 510, 520, 530, 540 increase from 70 degrees to 90 degrees in the clockwise direction with respect to the horizontal plane, the reflectivity in the reflection/transmission surfaces of the light reflectivity/transmittance control plates 510, 520, 530, 540 increases from 0% to about 100% in proportion to the inclination of the light reflectivity/transmittance control plates 510, 520, 530, 540. At this point, the reflectivity of 100% means that the light reflectivity/transmittance control plates 510, 520, 530, 540 reflect the light 500 fully, so that the light does not transmit through the light reflectivity/transmittance control plates 510, 520, 530, 540 at all.

Resultantly, the graph in FIG. 3 shows that the reflectivity and transmittance of the light are abruptly varied by controlling only the angles between the light and the light reflectivity/transmittance control plates 510, 520, 530, 540 in such a state in that the same kind of at least two of the light reflectivity/transmittance control plates are positioned on the light path.

Thus, in the case that the angles are varied; the light reflectivity/transmittance control plates 510, 520, 530, 540, in which the reflectivity and transmittance are varied, are used for splitting a single light beam into multiple light beams such that the multiple light beams are scanned onto a plurality of places. In that case, it is preferable that the split light beams have an equivalent intensity.

Hereinafter, there is described in more detail an operation mechanism for splitting the light 500 into multiple light beams having a uniform intensity using the light reflectivity/transmittance control plates 510, 520, 530, 540 and the light incident angle control unit 555 with reference to FIGS. 1, 2, and 3.

As one embodiment, there is described a mechanism for splitting the light 590 having a power of 400 watts generated from the light generating unit 580 into four light beams each having an intensity of 100 watts uniformly at designated places, A, B, C and D using the light reflectivity/transmittance control plates 510, 520, 530, 540 and the plate rotating unit 550.

To realize this, the light reflectivity/transmittance control plates 510, 520, 530, 540 are arranged in series such that the light 590 of 400 watts generated from the light generating unit 580 transmits the reflection/transmission surfaces of the light reflectivity/transmittance control plates 510, 520, 530, 540 arranged on an advancing path of the light.

Hereinafter, the light reflectivity/transmittance control plates 510, 520, 530, 540 are respectively defined as a first light reflectivity/transmittance control plate 540, a second light reflectivity/transmittance control plate 530, a third light reflectivity/transmittance control plate 520, and a fourth light reflectivity/transmittance control plate 510.

At this time, as one embodiment of the present invention, the light generating unit 580 is disposed adjacent to the first light reflectivity/transmittance control plate 540 while it faces the first light reflectivity/transmittance control plate 540.

Such positions of the light reflectivity/transmittance control plates 510, 520, 530, 540 allow the incident light 590 to subsequently pass the first light reflectivity/transmittance control plate 540, the second light reflectivity/transmittance control plate 530, and the third light reflectivity/transmittance control plate 520, and to arrive at the fourth light reflectivity/transmittance control plate 510.

Hereinafter, there is described a mechanism in which the incident light 590 is uniformly split through the first light reflectivity/transmittance control plate 540, the second light reflectivity/transmittance control plate 530, the third light reflectivity/transmittance control plate 520, and the fourth light reflectivity/transmittance control plate 510.

As one embodiment, the light generating unit 580 generates a light 590 having a power of 400 watts and the light reflectivity/transmittance control plate is comprised of four plates 510, 520, 530, 540 of first, second, third and fourth light reflectivity/transmittance control plates.

First, with reference to FIG. 1, in order for a light having a power of 100 watts to be irradiated at the point D from the first light reflectivity/transmittance control plate 540, it is required that the incident light of 100 watts be reflected by the first light reflectivity/transmittance control plate 540 and, further that the remaining light of 300 watts be transmitted to the first light reflectivity/transmittance control plate 540. In other words, this means that the first light reflectivity/transmittance control plate 540 reflects one-fourth (25%) of a total amount of the incident light 590 having the power of 400 watts and transmits the remaining three-fourths (75%) of the total amount of the light 590.

To realize this, the reflectivity of the first light reflectivity/transmittance control plate 540 is controlled depending on the relationship shown in the graph of FIG. 3, thereby having a slope angle of θ1. The angle of θ1 is obtained from the graph in FIG. 3. In other words, in FIG. 3, a point where the reflectivity of about 25% meets the curve corresponds to θ1.

Similarly, the remaining light of 300 watts in the light 590 of 400 watts generated from the light generating unit 580 is incident into the second reflectivity/transmittance control plate 530. At that point, the second light reflectivity/transmittance control plate 530 reflects only one-third (33.3%) of a total amount of the incident light 590 of 300 watts and transmits the remaining two-thirds (66.7%) of 200 watts, so that the reflected light of 100 watts is scanned at the point C.

To realize this, it is required that the second light reflectivity/transmittance control plate 530 should have a reflectivity of one-third (about 33.3%) and a transmittance of two-thirds (about 66.7%) Similarly, the second light reflectivity/transmittance control plate 530 should be inclined by an angle of θ2 in the counterclockwise direction with respect to the horizontal plane. Like that of θ1, the angle of θ2 is obtained from the graph of FIG. 3. Specifically, in the graph of FIG. 3, a point where the reflectivity of about 33.3% meets the curve corresponds to θ2.

While the light of 100 watts is scanned at the point C through the second light reflectivity/transmittance control plate 530, the remaining light of 200 watts is incident into the third light reflectivity/transmittance control plate 520.

Again, since the third light reflectivity/transmittance control plate 520 scans the light of 100 watts at the point B among the total incident light amount of 200 watts, it should have a reflectivity of 50% and a transmittance of 50%.

To realize this, it is required that the third light reflectivity/transmittance control plate 520 be inclined by an angle of θ3 in the counterclockwise direction with respect to the horizontal plane. Like the angles of θ1 and θ2, the angle of θ3 is also obtained from the graph of FIG. 3. Specifically, in FIG. 3, a point where the reflectivity of 50% meets the curve corresponds to θ3.

While the light of 100 watts is scanned at the point B through the third light reflectivity/transmittance control plate 520, the remaining light of 100 watts is incident into the fourth light reflectivity/transmittance control plate 510.

Similarly, the fourth light reflectivity/transmittance control plate 510 has the reflectivity of 100%. This is because all of the incident light amount of 100 watts has to be reflected by the fourth light reflectivity/transmittance control plate 510 such that the light amount of 100 watts arrives at the point A.

To realize this, it is required that the fourth light reflectivity/transmittance control plate 510 be inclined by an angle of θ4 in the counterclockwise direction with respect to the horizontal plane. As in the angles of θ1, θ2 and θ3, the angle of θ4 is also obtained from the graph of FIG. 3. Specifically, in the graph of FIG. 3, a point where the reflectivity of 100% meets the curve corresponds to θ4.

Thus, in order to allow plural light beams having the same power to be scanned at plural places by controlling the reflectivity of the incident light 590, which is incident into the reflection/transmission surface of the light reflectivity/transmittance control plates 510, 520, 530, 540, as one embodiment, the light reflectivity/transmittance control plates 510, 520, 530, 540 are constituted to include light multiple division lenses 510*a*, 520*a*, 530*a*, 540*a* and a light incident angle control unit 555 coupled to the light multiple division lenses 510*a*, 520*a*, 530*a*, 540*a*, as shown in FIG. 2.

The light incident angle control unit 555 comprises a rotational shaft 512, 522, 532, 542, fixedly coupled to a selected portion of the circumference of the light multiple division lenses 510*a*, 520*a*, 530*a*, 540*a*, and a rotational motor 550, coupled to the rotational shaft 512, 522, 532, 542, for rotating the coupled rotational shaft 512, 522, 532, 542 in the clockwise or counterclockwise direction.

Hereinafter, described is a detailed constitution of the workpiece substrate multiple cutting apparatus to which the light multiple-splitting apparatus 500 having the aforementioned constitution and operation mechanism is applied with reference to the accompanying drawings of FIGS. 4, 5, and 6.

Figure 4:
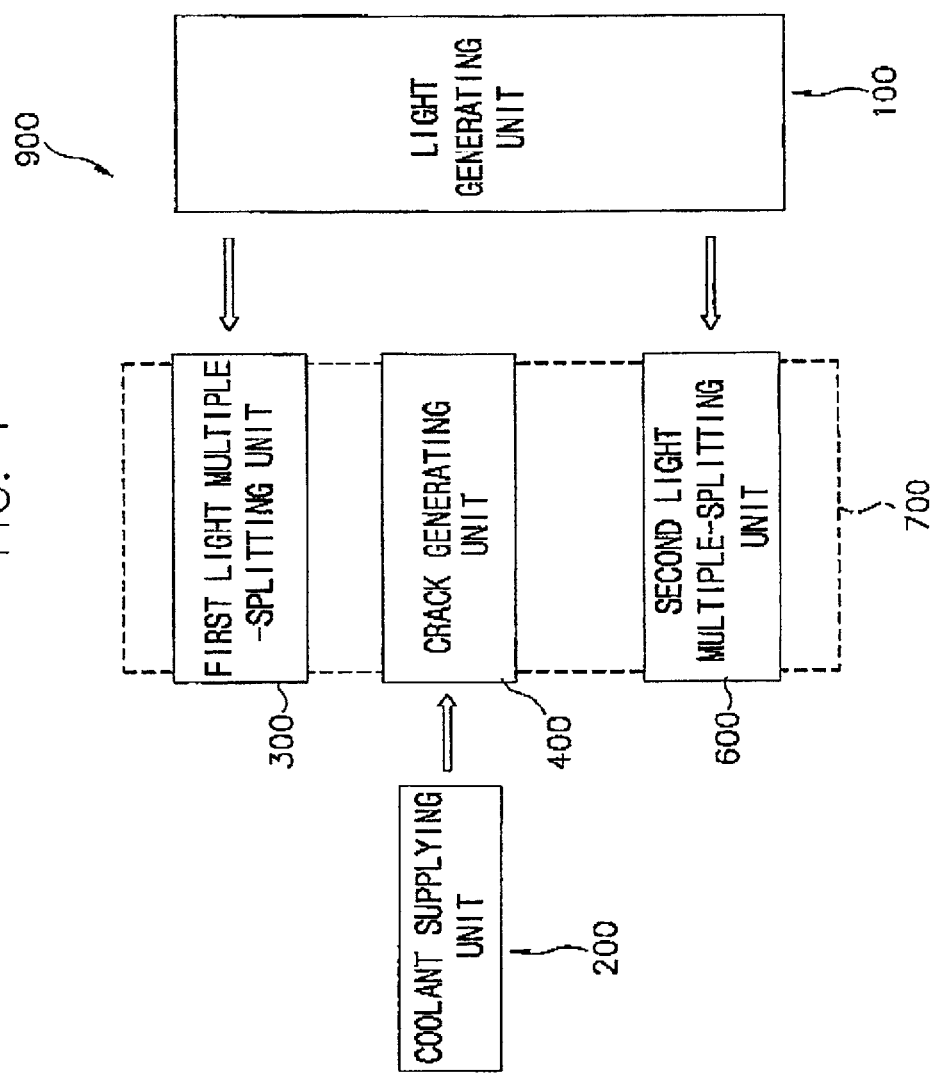
FIG. 4 is a schematic view of a substrate cutting apparatus using a light splitting unit in accordance with another preferred embodiment of the present invention.
Figure 5:
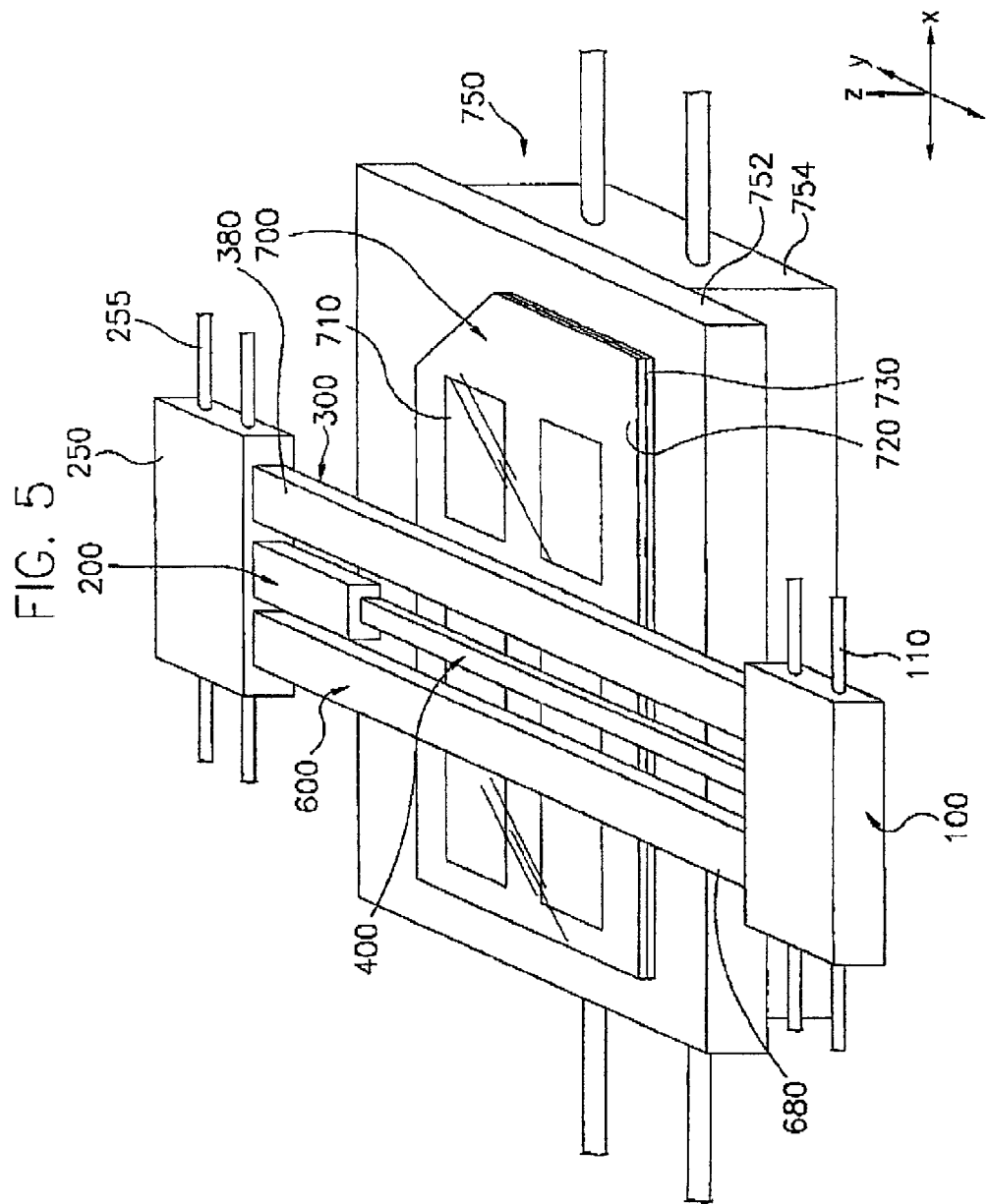
FIG. 5 is a perspective view of a substrate cutting apparatus in accordance with another preferred embodiment of the present invention.

Referring to FIGS. 4 and 5, a substrate multiple-cutting apparatus 900 includes a light generating unit 100, a first light multiple-splitting unit 300, a crack generating unit 400, a second light multiple-splitting unit 600 and a mother substrate-transferring unit 750.

Specifically, the mother substrate-transferring unit 750 includes a transferring body 754 and a transferring body driving unit 752. More specifically, the transferring body 754 has a sufficient planar area to mount an assembled workpiece substrate 700 thereon. On the transferring body 754, the transferring body driving unit 752 is established to transfer the transferring body 754 along the x-axis direction of x-y-z coordinates.

Meanwhile, at places spaced apart by a certain distance outwardly along the z-axis direction from the mother substrate transferring unit 750, there are disposed the light generating unit 100 and a coolant supplying unit 200 for supplying a coolant to the crack generating unit 400. The light generating unit 100 and the coolant supplying unit 200 are coupled to their respective transferring units 110 and 255.

The transferring units 110 and 255 function to reciprocate the light generating unit 100 and the coolant supplying unit 200 at the same velocity in a direction parallel to the x-axis.

Figure 6:
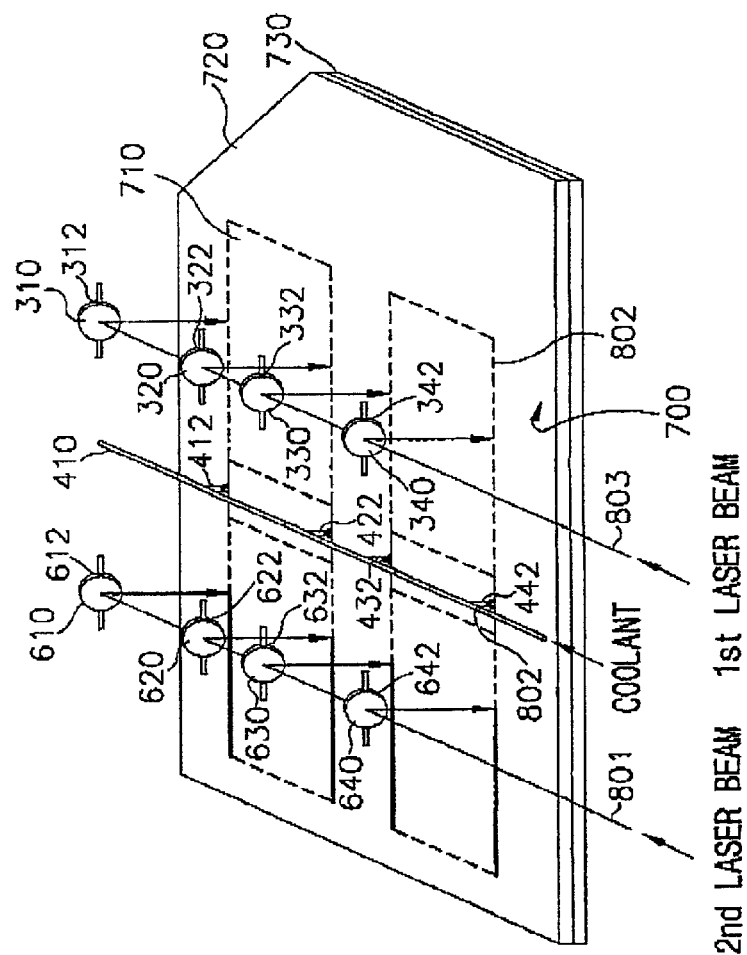
FIG. 6 is a schematic view explaining the structure and functions of the substrate cutting apparatus in accordance with one embodiment of the present invention.

Meanwhile, the light generating unit 100 irradiates two light beams 810 and 803 toward the coolant supplying unit 200 from two portions thereof as shown in FIG. 6. Hereinafter, one of the two light beams as irradiated is defined as a first light beam 803 and the other is defined as a second light beam 801.

On a path through which the first light beam 803 passes, there is disposed a first light multiple-splitting unit 300, and on a path through which the second light beam 801, there is disposed a second light multiple-splitting unit 600.

Particularly, the first light multiple-splitting unit 300 includes plural light reflectivity/transmittance control plates 310, 320, 330, 340, plural plate rotating units 312, 322, 332, 342 and a plate fixing case 380 as shown in FIG. 5.

First, the plate fixing case 380 has a through hole formed along its length direction and it is disposed between the light generating unit 100 and the coolant supplying unit 200. The first light beam 803 passes through the through hole of the plate fixing case 380.

Inside the plate fixing case 380, at least two light reflectivity/transmittance control plates are established. As one embodiment, FIG. 6 shows that four light reflectivity/ transmittance control plates 310, 320, 330, 340 are established.

The light reflectivity/transmittance control plates 310, 320, 330, 340 have a close relationship with the position of an LCD unit cell 710 formed in the assembled workpiece mother substrate 700. Particularly, the LCD unit cell 710 has two edges in the x-axis direction and two edges in the y-axis direction. Thus, in order to separate the LCD unit cell 710 from the assembled workpiece mother substrate 700, it is necessary to cut two x-directional lines and two y-directional lines.

At that point, in order to cut the two x-directional lines or the two y-directional lines using a single light beam at the same time, it is necessary to use two light reflectivity/ transmittance control plates.

Thus, in order to cut four x-directional prescribed lines or four y-directional prescribed lines of four LCD unit cells 710 in a matrix configuration of 2 by 2 from the assembled workpiece mother substrate 700 using a single light beam at the same time, it is necessary to use four light reflectivity/ transmittance control plates.

Similarly, an interval between the light reflectivity/ transmittance control plates 310, 320, 330, 340 is precisely controlled such that the split light beams correspond to the four x-directional prescribed lines or four y-directional prescribed lines precisely.

Meanwhile, the second light multiple-splitting unit 600 includes plural light reflectivity/transmittance control plates 610, 620, 630, 640, plural plate rotating units 612, 622, 632, 642 and a plate fixing case 680 as shown in FIGS. 5 and 6.

First, the plate fixing case 680 has a through hole formed along its length direction and it is disposed between the light generating unit 100 and the coolant supplying unit 200. The second light beam 801 passes through the through hole of the plate fixing case 680.

Inside the plate fixing case 680, at least two light reflectivity/transmittance control plates are established. As one embodiment, FIG. 6 shows that four light reflectivity/ transmittance control plates 610, 620, 630, 640 are established.

In the same manner as in the first light reflectivity/ transmittance control plates 310, 320, 330, 340, the second light reflectivity/transmittance control plates 610, 620, 630, 640 are established to have a number sufficient to cut either four x-directional prescribed lines or four y-directional prescribed lines at the same time.

Meanwhile, between the first light multiple-splitting unit 300 and the second light multiple light-splitting unit 600, there is disposed the crack generating unit 400. The crack generating unit 400 functions to inject coolant onto locally heated prescribed lines of the assembled workpiece mother substrate 700.

To realize this, the crack generating unit 400 includes a coolant supply pipe 410 for transferring a coolant from the coolant supplying unit 200 to a position at which the coolant is being sprayed, and a coolant spraying nozzle 412, 422, 432, 442 for spraying the coolant transferred from the coolant supply pipe 410 onto the locally heated position.

Hereinafter, there is described a singulation method of the LCD unit cell from the assembled workpiece mother substrate 700 using the substrate multiple-splitting apparatus 900 in accordance with one embodiment of the present invention with reference to the accompanying drawings of FIGS. 7, 8, 9, and 10.

Figure 7:
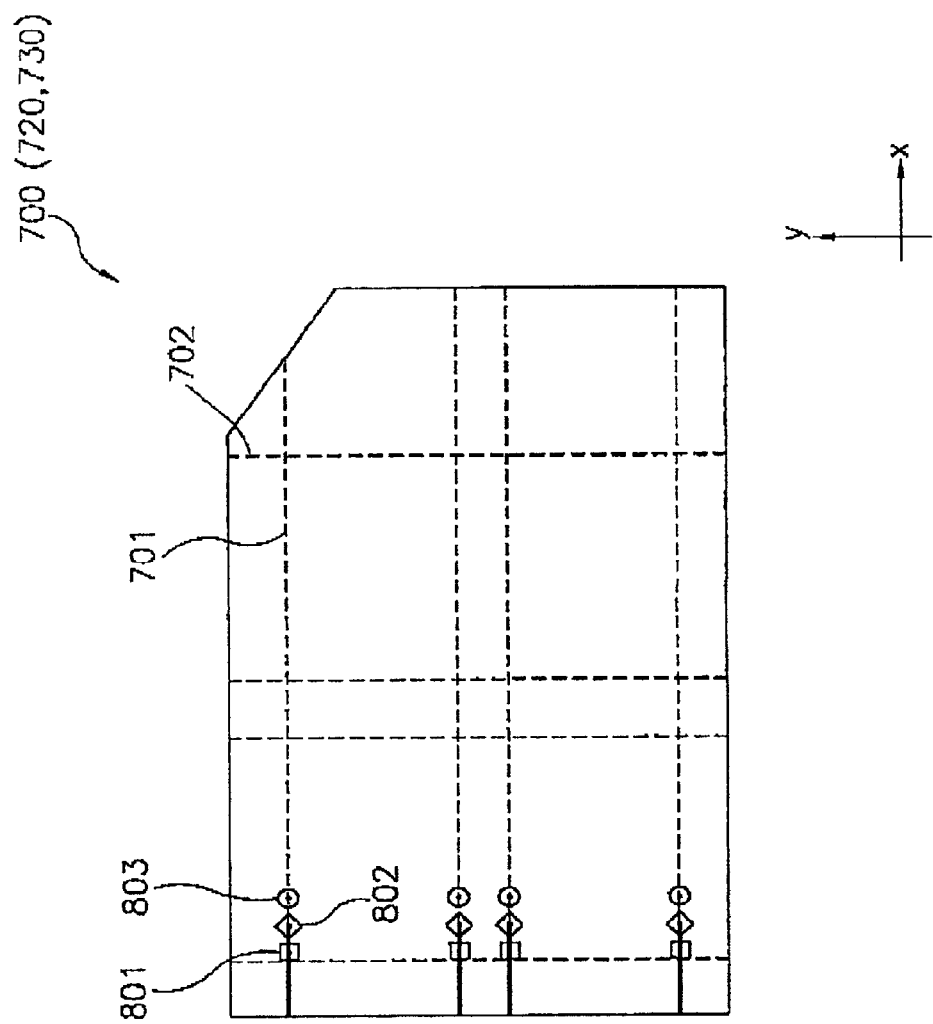
FIGS. 7 and 8 are schematic views for describing a method of cutting a substrate along an X-axis in accordance with one embodiment of the present invention.
Figure 8:
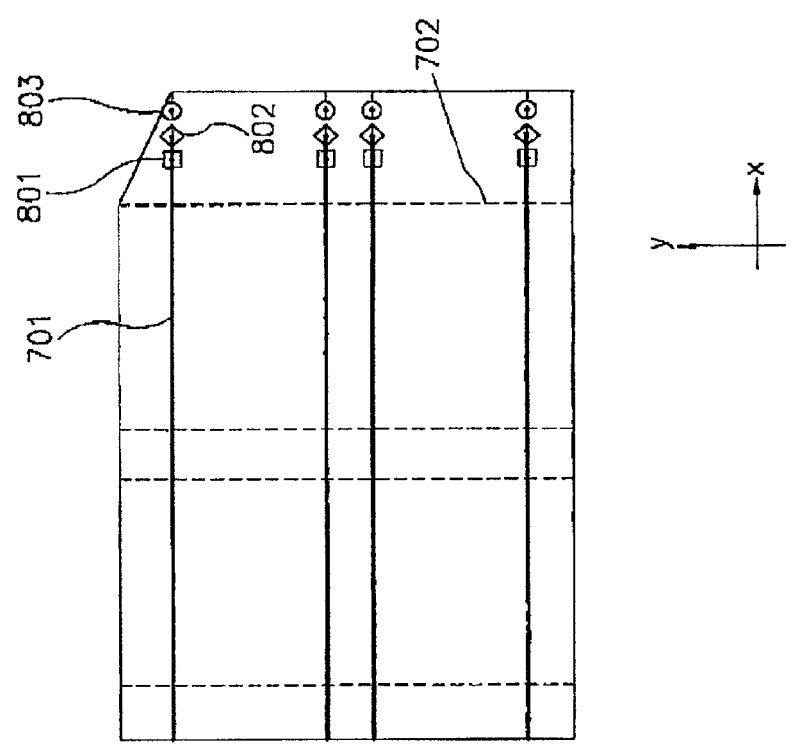

First, as shown in FIG. 7, in a state that a first large-sized mother glass substrate 720 for a thin film transistor (TFT) substrate and a second large-sized mother glass substrate 730 for a color filter substrate are aligned and attached with facing each other, and then a liquid crystal injecting process is completed, the attached workpiece mother substrate 700 is mounted on the transferring body 754 of the mother substrate transferring unit 750 (see FIG. 5) by a mother board transfer (not shown).

After that, the first light multiple-splitting unit 300, the crack generating unit 400 and the second light multiple-splitting unit 600 are aligned with at least two positions on a one-sided surface of the assembled workpiece mother substrate 700.

Afterwards, as shown in FIG. 7, the first light beam 803 is supplied into the first light multiple-splitting unit 300. The first light multiple-splitting unit 300 splits the first light beam 803 into uniform multiple light beams each having the same intensity and scans the split light beams onto the positions which are being cut so that the scanned portions are rapidly heated.

Thereafter, the rapidly heated portions are rapidly cooled by a coolant 802 sprayed from the crack generating unit 400, which is established to the rear of the first light multiple-splitting unit 300, so that a scribe crack is generated to a predetermined depth from the upper surface of the rapidly heated portion.

After that, the second light beam 801, split by the second light multiple-splitting unit 600, is irradiated onto the scribe crack to heat-expand the scribe crack portion locally, rapidly, so that the scribe crack portion is completely separated by the heat expansion. Thus, the x-directional prescribed lines 701 of the LCD unit cells 710 in the assembled workpiece mother substrate 700 are all cut.

Figure 9:
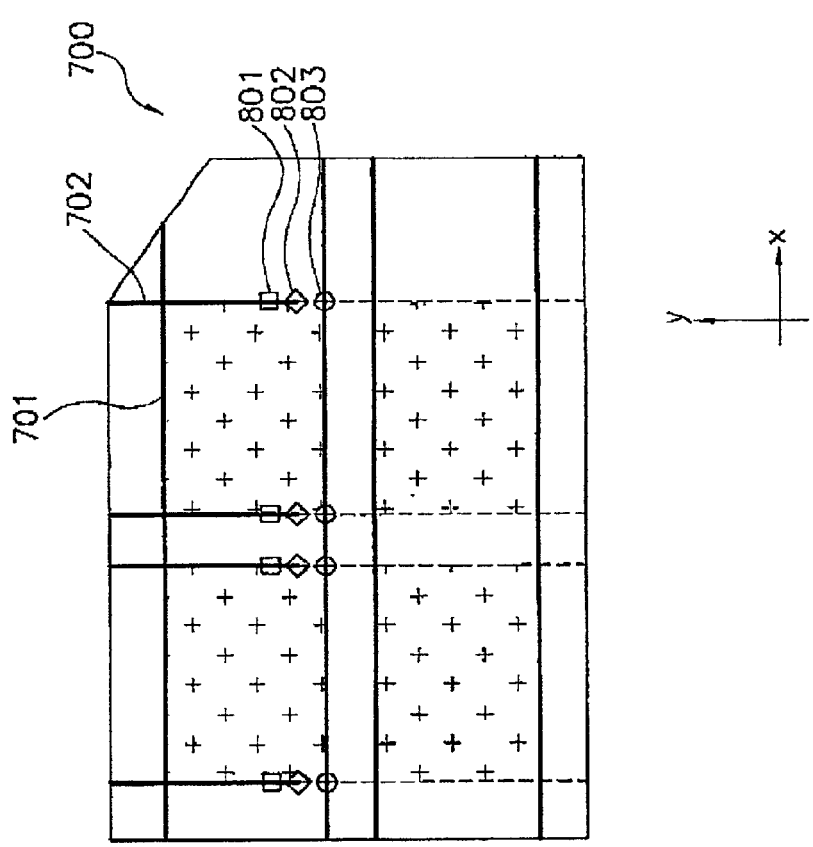
FIGS. 9 and 10 are schematic views for describing a method of cutting a substrate along a Y-axis in accordance with one embodiment of the present invention.
Figure 10:
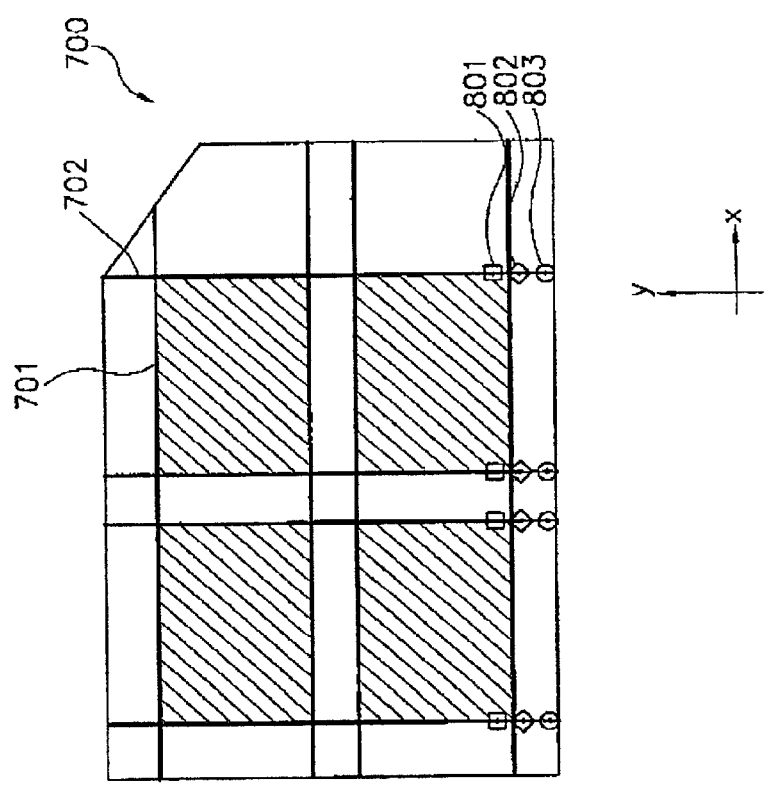

Thereafter, as shown in FIGS. 9 and 10, in a state that the once split workpiece mother substrate is rotated horizontally by 90 degrees, y-directional prescribed lines 702 are cut by the first split light beam 803, the coolant 802 and the second split light beam 801, so that an LCD panel is manufactured.

Afterwards, the LCD panel is transferred into an LCD panel assembly manufacturing process and thus an LCD panel assembly is manufactured.

As described previously in detail, according to the present invention, plural LCD unit cells formed in a single large-size mother glass substrate are concurrently cut by splitting a single incident light into plural light beams, so that time necessary for the singulation of the LCD unit from the mother glass substrate is substantially shortened.

Further, a single incident light is split into plural light beams to perform a cutting process at plural places, so that an apparatus for cutting LCD unit cells from the mother substrate is simplified.

While the present invention has been described in detail, it should be understood that various changes, substitutions and alterations can be made hereto without departing from the spirit and scope of the invention as defined by the appended claims.

What is claimed is:

1. A method for multiple-cutting a substrate, the method comprising steps of:
  reflecting a part of an incident light having a first advancing direction to have a second advancing direction and allowing a remaining part of the incident light to advance along the first advancing direction to thereby split the incident light into at least two light beams;

scanning the split light beams along a plurality of selected paths on the substrate to locally heat selected portions of the substrate; and generating cracks at the heated portions.

2. The method of claim 1, wherein the step of generating the cracks is performed by spraying a coolant onto the locally heated portions of the substrate.

3. The method of claim 1, wherein the splitting of the light is performed such that the split light beams have the same intensity.

4. The method of claim 1, further comprising a step of scanning another spilt lights onto the cracks to cut the substrate.

5. An apparatus for cutting a substrate into a plurality of parts using a single scanning of a light, the apparatus comprising;

a light spitting unit for splitting a light generated from a light generating unit using at least two light reflectivity/transmittance control plates of which light reflectivity/transmittance is varied depending on an angle between the generated light and the plates, and for scanning the split lights along a plurality of selected paths on the substrate to locally heat selected portions of the substrate; and a crack generating unit for generating a crack at the locally heated selected portions of the substrate.

6. The apparatus of claim 5, wherein said light splitting unit is formed at both sides of the crack generating unit.

7. The apparatus of claim 5, further comprising a light incident angle control unit for controlling an incident angle of the light, wherein the light reflectivity of the light reflectivity/transmittance control plates is controlled by the light reflectivity/transmittance control plates and the light incident angle control unit, wherein the light incident angle control unit controls an intensity of the light such that lights reflected from the light reflectivity/transmittance control plates have a same intensity.

8. The apparatus of claim 5, wherein said crack generating unit comprises a coolant supply unit for supplying a coolant and a coolant spraying nozzle for spraying the supplied coolant onto the locally heated selected portions of the substrate.

9. A cutting device comprising:

a first light generating unit for generating a first incident light in a first direction;

a first light splitting unit for splitting the first incident light into a plurality of lights and directing the plurality of lights toward a target object; and a transportation unit for moving the light splitting unit in a second direction different form the first direction such that the plurality of lights are scanned along a plurality of predetermined paths on the target object.

10. The cutting device of claim 9, wherein the second direction is perpendicular to the first direction.

11. The cutting device of claim 9, wherein the plurality of predetermined paths are substantially parallel to each other.

12. The cutting device of claim 9, wherein the first light splitting unit comprises an N number of plates for splitting the first incident lights into the N number of lights and directing the N number of lights toward the N number of target points on the target object.

13. The cutting device of claim 12, wherein the N number of plates comprising:

a first plate for reflecting a portion of the first incident light from the light generating unit toward a first target point of the target object and transmitting a remaining portion of the incident light to a next plate;

second to N−1)th plates, each reflecting a portion of the first incident light transmitted from a previous plate toward a corresponding one of second to N−1)th target points of the target object and transmitting a remaining portion of the first incident light to a next plate; and an (N)th plate for reflecting the first incident light transmitted from the N−1)th plate toward an (N)th target point of the target object, wherein N is equal to or greater than 2, and if N is 2, the second plate is the (N)th plate.

14. The cutting device of claim 13, wherein the (N)th plate reflects 100% of the first incident light transmitted from N−1)th plate toward the (N)th target point of the target object.

15. The cutting device of claim 12, wherein the N number of lights split by the first light splitting unit have the same intensity.

16. The cutting device of claim 15, further comprising a plate control unit for control reflectivity and transmittance of the N number of plates such that the portion of the first incident light reflected by each plate has the same intensity.

17. The cutting device of claim 16, wherein the pate control unit controls the reflectivity and transmittance by controlling angles of the N number of plates.

18. The cutting device of claim 9, further comprising a coolant unit for applying a coolant along the plurality of predetermined paths.

19. The cutting device of claim 18, further comprising:

a second light generating unit generating a second incident light;

a second light splitting unit for splitting the second incident light into a plurality of lights and directing the plurality of lights toward the target object, wherein the transportation unit moves the first light splitting unit and the second light splitting unit in the second direction with a predetermined space therebetween.

20. The cutting device of claim 19, wherein the coolant unit is arranged between the first light splitting unit and the second light splitting unit.

* * * * *

UNITED STATES PATENT AND TRADEMARK OFFICE
CERTIFICATE OF CORRECTION

PATENT NO. : 6,770,842 B2
DATED : August 3, 2004
INVENTOR(S) : Hyung-Woo Nam et al.

It is certified that error appears in the above-identified patent and that said Letters Patent is hereby corrected as shown below:

Column 10,
Lines 15, 17, 21 and 27, delete "N-1)th" and insert -- (N-1)th --.

Signed and Sealed this

Thirtieth Day of November, 2004

JON W. DUDAS
*Director of the United States Patent and Trademark Office*